(12) United States Patent
Spivey et al.

(10) Patent No.: US 12,365,490 B2
(45) Date of Patent: Jul. 22, 2025

(54) SUNLIT ORBITAL DEBRIS SEARCH USING HIERARCHICAL PROCESSING

(71) Applicant: JASR Systems, LLC, Solana Beach, CA (US)

(72) Inventors: Brett Alverson Spivey, Carlsbad, CA (US); Christopher Sexton, San Diego, CA (US)

(73) Assignee: JASR Systems, LLC, Solana Beach, CA (US)

( * ) Notice: Subject to any disclaimer, the term of this patent is extended or adjusted under 35 U.S.C. 154(b) by 437 days.

(21) Appl. No.: 17/963,579

(22) Filed: Oct. 11, 2022

(65) Prior Publication Data

US 2023/0322421 A1 Oct. 12, 2023

Related U.S. Application Data (60) Provisional application No. 63/329,931, filed on Apr. 12, 2022.

(51) Int. Cl.
*B64G 1/68* (2006.01)
*G06V 20/52* (2022.01)

(52) U.S. Cl.
CPC ............. *B64G 1/68* (2013.01); *G06V 20/52* (2022.01)

(58) Field of Classification Search
None
See application file for complete search history.

(56) References Cited

U.S. PATENT DOCUMENTS

| | | | |
|---|---|---|---|
| 9,916,507 B1* | 3/2018 | Freedman | H04N 23/661 |
| 2009/0281566 A1 | 11/2009 | Edwards et al. | |
| 2017/0366264 A1 | 12/2017 | Riesing et al. | |
| 2020/0174094 A1* | 6/2020 | Tchilian | G01S 5/163 |

OTHER PUBLICATIONS

Apr. 14, 2023, International Search Report and Written Opinion Issued in corresponding International Application No. PCT/US23/11807.

* cited by examiner

*Primary Examiner* — Delomia L Gilliard
(74) *Attorney, Agent, or Firm* — Clements Bernard Walker; Christopher L. Bernard (57) ABSTRACT

The present disclosure provides a system that searches for and finds orbital debris that can be a hazard to satellites and the like, for which the debris is sunlit. The system includes a ground-based telescope pointed at the sky; a detector array that detects images of the sunlit debris crossing the field of the detector; and a processing system that computes tracks from the detector data using a hierarchical algorithm, which builds longer tracks from previously computed shorter tracks, determines whether the computed tracks correspond to valid debris detections, and converts the track computations into debris brightness and debris orbital trajectory.

25 Claims, 6 Drawing Sheets

SUNLIT ORBITAL DEBRIS SEARCH USING HIERARCHICAL PROCESSING

CROSS-REFERENCE TO RELATED APPLICATION

The present disclosure claims the benefit of priority of U.S. Provisional Patent Application No. 63/329,931, filed on Apr. 12, 2022, and entitled "COMPUTATIONAL APPROACH TO SPACE DEBRIS SEARCH AND MANAGEMENT," the contents of which are incorporated in full by reference herein.

INTRODUCTION

The present disclosure relates to search for orbital debris that can be a hazard to satellites. The present disclosure relates to a system to detect this debris using ground-based detectors. The debris is sunlit, yet the sun is below the horizon.

At sunrise/sunset, the sky is still relatively bright, and the sky background creates noise in the detector. As the sun position becomes lower with respect to the horizon, the sky darkens, and the sky background creates less detector noise.

At some point, depending on the debris orbit, the debris is usually eclipsed by the earth and is no longer sunlit. Lower altitude debris eclipses soonest after sunset and leaves eclipse latest before sunrise, and so the available time from sunrise/sunset to eclipse is the shortest. Since there is a limited amount of time between sunrise/sunset and this eclipse, it is beneficial to maximize the available detection window. Detection window is maximized when the detection system can operate when the sun angle below the horizon is as small as possible, which implies the sky background level is as large as possible.

Figure 1:
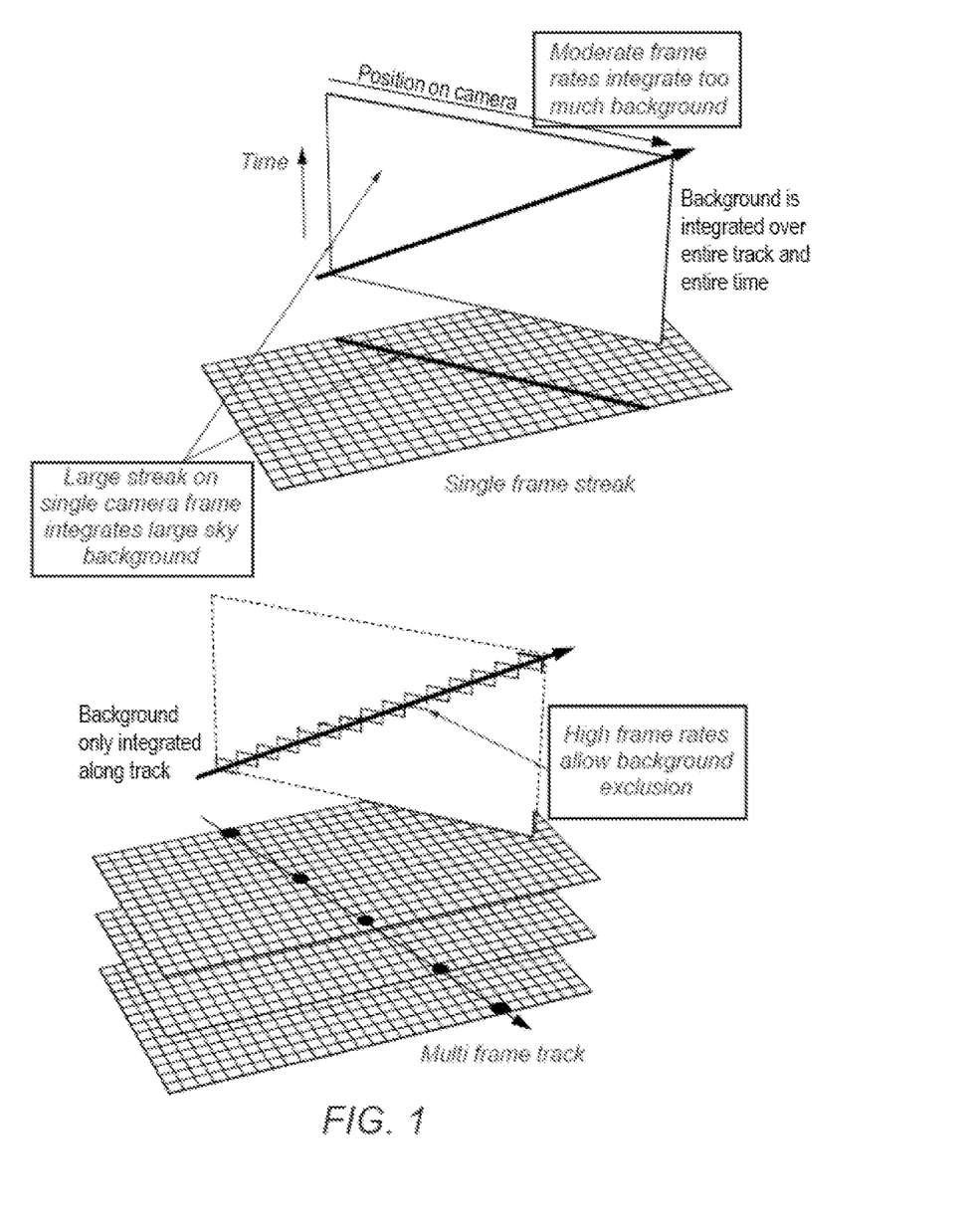
FIG. 1 is a schematic diagram illustrating why computing tracks with higher frame rates collects less background than lower frame rate cameras, if combined with the processing to compute the sums along the many candidate tracks.

The ability to detect the debris against sky background levels depends on the processing algorithm as well as other factors involving the optics and detector. Algorithms that are more robust with respect to sky background do so by rejecting this background with processing. However, the algorithms can be computationally intensive. To reject background noise, one must sum only camera data that corresponds to the instantaneous signal from the debris at that point in time without including signal from other spatial locations or temporal locations. This requires cameras that are operating at high enough frame rate to isolate the debris to a few pixels per frame; lower frame rate cameras measure a linear streak across the detector for the fast-moving debris. In addition, the processing algorithms must compute the sum of the tracks for every reasonable trajectory candidate while excluding signal which is not on this track. FIG. 1 illustrates why computing tracks with higher frame rates collects less background than lower frame rate cameras, if combined with the processing to compute the sums along the many candidate tracks.

SUMMARY

The present disclosure applies computational techniques which are good at background rejection yet require practical levels of processing.

Commonly the algorithms for debris detection create virtual digital tracks of streaking particles passing across a 2-dimensional array detector, with readout frames in time which creates a third dimension for the data. The search is therefore to find linear tracks imbedded within this 3-dimensional data set. These tracks are searched by adding the signals along the track and finding tracks with anomalously high totals. The space of linear tracks within a 3D data set is fundamentally a 4-dimensional search space, and so computing these tracks can be difficult even for modern signal processing systems.

The computations to add the linear track signals and search over a 4D search space can be made more efficient with the use of hierarchical algorithms. Hierarchical algorithms are defined to be techniques which compute shorter tracks, and then combine the shorter tracks into longer tracks in a hierarchical fashion. For example, if one computes all tracks of length 100 pixels for a data set, one can compute a track of length 200 pixels by adding 2 appropriate segments of length 100 pixels which match end to end. With this approach, the 200-length track is computed by adding 2 previously computed values rather than adding 200 values from the original data set.

The present disclosure provides a system that searches for and finds orbital debris that can be a hazard to satellites and the like, for which the debris is sunlit. The system includes a ground-based telescope pointed at the sky; a detector array that detects images of the sunlit debris crossing the field of the detector; and a processing system that computes tracks from the detector data using a hierarchical algorithm, which builds longer tracks from previously computed shorter tracks, determines whether the computed tracks correspond to valid debris detections, and converts the track computations into debris brightness and debris orbital trajectory.

The processing system is implemented on a graphics processor or multiple graphics processors. The detector array collects data at greater than 30 Hz. Computations are executed essentially in real time, so that the delay between measurement and output debris parameters is less than 10 seconds, for example, enabling a separated tracking system to acquire the debris while it is overhead.

BRIEF DESCRIPTION OF THE DRAWINGS

The present disclosure is illustrated and described herein with reference to the various drawings in which like reference numbers are used to denote like system components/method steps, as appropriate, and in which.

DETAILED DESCRIPTION

Figure 2:
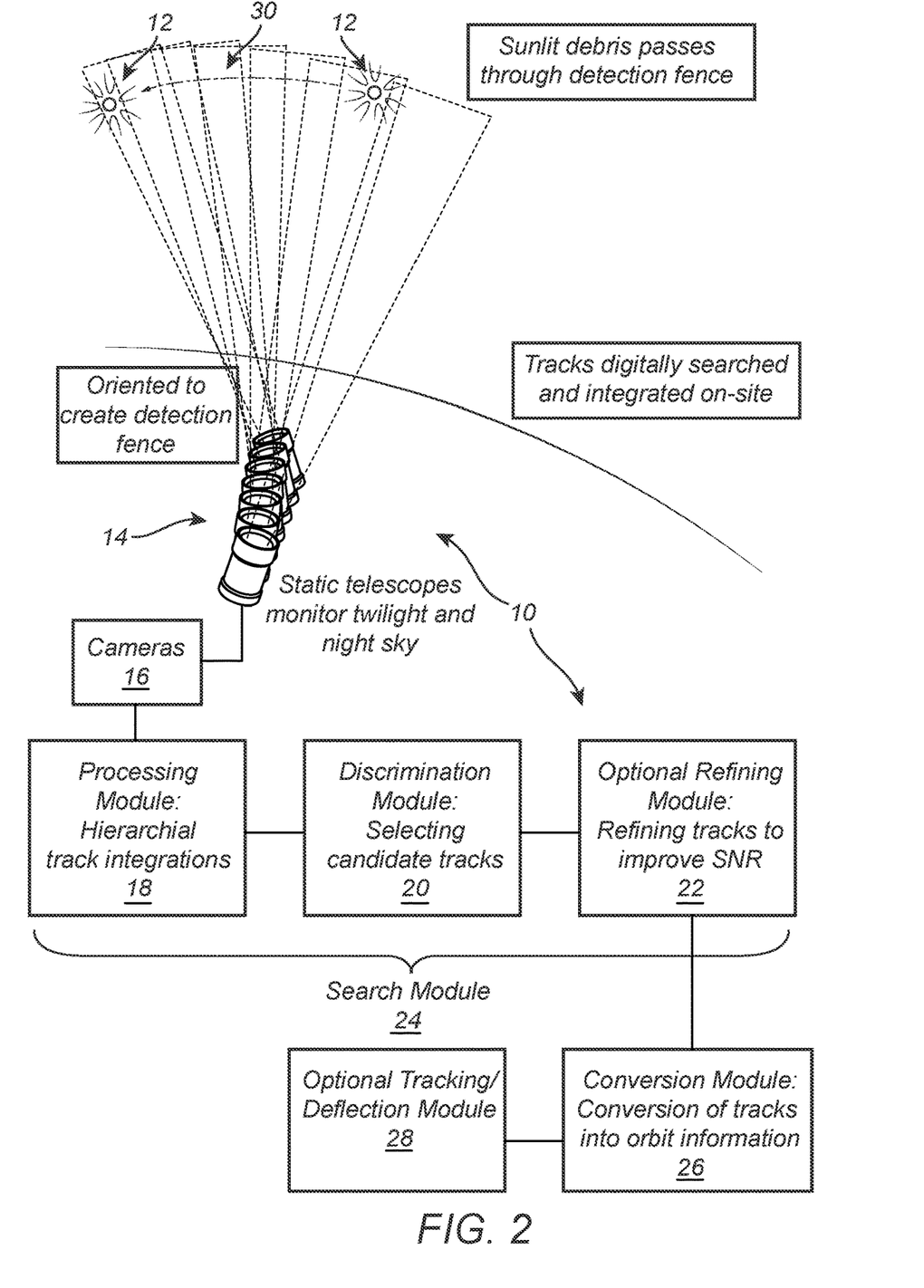
FIG. 2 is a schematic diagram illustrating one embodiment of the system of the present disclosure.

Referring now specifically to FIG. 2, the system 10 of the present disclosure operates at twilight and later, at which time the sky is reasonably dark, but the debris 12 is still solar illuminated. Each telescope 14 is coupled to one or more cameras 16. The debris image passes the camera 16 at high rate. While thresholding on a single pixel in a single frame can detect large debris, small debris is found by integrating the frames along tracks before thresholding. Computations are carried out using a processing module 18, a discrimination module 20, and an optional refining module 22 that make up a search module 24 to search for objects/debris 12, which are then converted to orbit information 26 and may then be tracked and/or deflected via an optional tracking/deflection module 28.

Graphics processors are ideal for the computations of the present disclosure. Their architecture is perfectly suited to computing many trajectories from a subset of data, and the low bit depth of the data is compatible with tensor core processing capabilities of modern processors.

The present disclosure models the debris signal vs. background, debris size, time after sunset/before sunrise, and altitude, and also evaluates SNR for various computational resources.

Due to recent advances in camera performance, the optical and sensor technology is commercial and off-the-shelf. Commercial off-the-shelf graphics processors may also be used for computation.

The nominal configuration is separate cameras 16/telescopes 14, statically mounted, each providing a 3° 'fence' 30 which detects debris passing through. This can cover 60° by using 20 separate systems looking in a north-to-south or east-to-west line, for example. The system may be housed near the equator preferably at a dark site. It will be readily apparent to those of ordinary skill in the art that other suitable search configurations may be used as well.

There are several choices for optics. A viable and low-cost approach is provided using separate apertures. The number of apertures used can be as low as 1, but more apertures increase search rate. The optics need no gimbal; they may be statically mounted. An alternative is to scan the telescopes 14 to decrease the number of apertures required.

The generic type of telescope 14 that is best suited for this task is called an astrograph, which has good imaging performance over a wide field of view and low f-number. Again, 3° FOV or the like is desired, in a 35 to 65 cm telescope. Astrographs of the Rowe-Ackermann Schmidt type are available in 8 in, 11 in, and 14 in sizes, etc. Astrographs of the Hamilton type also have good performance, and a 65 cm version built to search for comets could be scaled down for this application. All of these are suitable for this application, as are any comparable telescopes 14.

The camera/detector 16 that is preferred is a qCMOS detector or the like due to its extremely low read noise (0.43 electrons) and high output rate (>1 Gigapixel/s). This set of specs allows tracking at the very highest speeds required for lowest altitude debris, while suffering low penalty for digitally integrating higher altitude debris. The camera 16 may be operated in windowed mode, either 512×4096 or 256×4096, for example. The camera 16 is capable of up to 532 frames per second in these modes. The optimum frame rate depends on the sky background level and debris size but is typically >100 Hz.

The processing module 18 includes one or more high-end graphics processors, nominally using a single RTX3090 per detector 16/telescope 14, although use of as many as 8 in parallel would allow detection of significantly smaller debris. The processing module 18 first applies the hierarchical search algorithm. In one embodiment, the tracks that exceed a relatively high threshold selected by the discrimination module 20 are directly sent to the conversion module 26 to create trajectory information. In an alternate embodiment, track candidates that exceed a relatively low SNR threshold are winnowed, and then those tracks are recomputed by the refining module 22 using longer track integrations and/or more refined track integrations for that smaller subset, to find high SNR ~10-20 final discriminations with low false alarm rate and high track accuracy. This refined output is then sent to the conversion module 26 to convert the track information into trajectory information.

The data is described as 3D data set $I_{h,w,t}$ where:
- h refers to height on the detector, the vertical pixel number,
- w refers to width on the detector, the horizontal pixel number, and
- t refers to time, the frame number.

The detector 16 is wide in the length direction, spanning the fence direction, and narrower in the width direction, which is the direction across the fence 30. Typically, the length direction may have 2048-4096 pixels per camera 16, while in the width direction, the camera 16 would be configured to only output typically 256-512 pixels.

In the time direction, data is collected continually, and so the number of total frames would be many thousands. The data set is divided into process blocks which would have typically 1024 frames. The process blocks are overlapped so each track 12 across the width is fully contained within one of the process blocks. For the nominal algorithm, this requires an overlap equal to the number of width pixels.

The algorithm operates in hierarchical steps. A single step does the following:

1. Shifts the data in h and t proportional to w, to skew the data so that a new angle corresponds to horizontal. The skew is an interpolation of the output from the skewed input positions.
2. Downsamples the data in w with a filtered downsample algorithm.
3. This creates a new set of data $I1_{h',w',t'}$ where the new h' and t' dimensions are now skewed, and the new w' dimension now has fewer pixels. Therefore, the data has been transformed to have fewer width pixels and shifted to a new angle.

This is expressed as:

$$Iskew(h',w,t') = I(h=h'+\alpha w, w, t=t'+\beta w)$$

followed by:

$$I1(h',w',t') = \Sigma kernel(w'-w) Iskew(h',w,t')$$

where:
- h', t' are at the same sampling density as h, t,
- w' is sampled at lower density than w, typically 2×,
- α, β are the skew values used in the step, typically between −2 to 2 but usually between −1 to 1, and
- kernel(w'−w) is the interpolation kernel used for downsampling.

It should be noted that alternatively the above steps can be applied if h, w, and t are permuted, so that the skew applies to any 2 of the dimensions and the downsample applies to the third.

The preferred approach is to skew the data in t and h by ±½ pixel per w pixel (4 different choices: 2 choices for t and 2 choices for h), and downsample by a factor of 2 so that w' has half as many pixels as w. However, skewing into other sets such as {−⅔, 0, ⅔} by {−⅔, 0, ⅔} (9 choices) can also be done, as well as downsampling by other amounts including non-integer amounts. For example, the above example skew set of 9 choices could be appropriately downsampled by 3×.

These steps can be linked together. After downsampling, the next step applies a new skew from a set of new skew choices. Since the data has been downsampled in width, the effect of the new skew is a demagnified set of angles in real space. Thus, the skew for each subsequent step down the line has the effect of applying angles at successively finer angular resolution.

At the terminal step, the downsampled width is a single pixel wide, and the array of values is {height×time} for that particular series of skew selections. The effective skew is the sum of the skew selection values for each of height and time, appropriately demagnified by the downsampling ratio at that step. These sums then correspond to the track integrations associated with that associated angle for each height and time value. The maximum value in this array is selected, and we save this maximum value, as well as the frame number, the height position, the width position, and the associated height and time angles.

Figure 3:
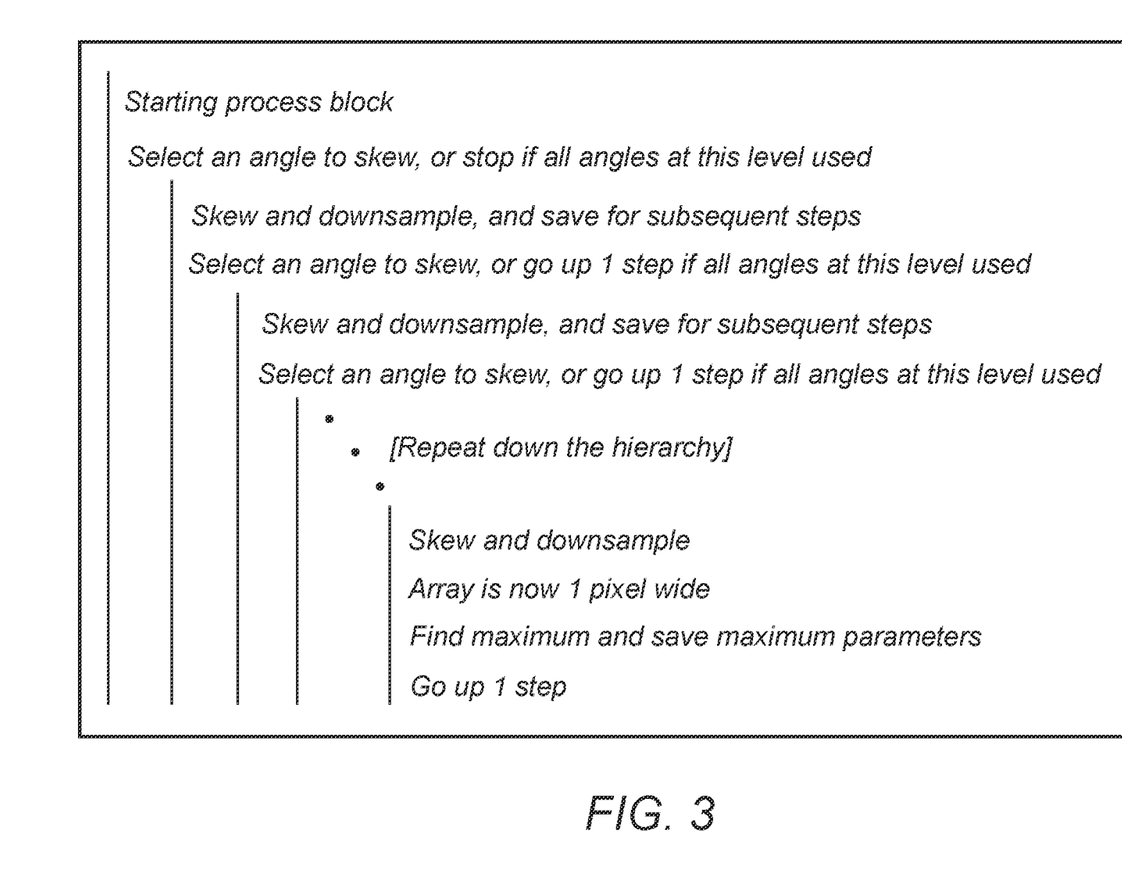
FIG. 3 is a schematic diagram illustrating one embodiment of a skew process of the present disclosure, this process repeated up the chain of hierarchical steps until the entire set of angles at all steps is exhausted.

The previous computations up the hierarchical chain have been saved, so after the terminal step, we now go back up one hierarchical step and select a different skew for height and time. This is repeated. Once all of selections one step up have been exhausted, we back up an additional hierarchical step and select a different skew pair from that earlier hierarchical step. This process is repeated up the chain of hierarchical steps until the entire set of angles at all steps is exhausted, as illustrated in FIG. 3.

If a detection is made on the data set which has sufficiently high signal-to-noise ratio, the particle is considered either debris or a candidate for further analysis. If analyzed further, the region around the track (spatially and angularly) is recomputed with either better resolved tracks or longer tracks. The signal-to-noise ratio threshold is a variable parameter that is selected based on the desired false alarm rate needed. The conversion module 26 then converts the track information, using knowledge of the telescope orientation, into debris angular motion and brightness. The data is processed substantially in real time so that the data can be sent to a separate tracking or deflection system 28, although in another embodiment offline processing using these techniques, with no real-time handoff, is also possible. Upon a debris detection event, the data is immediately passed to the separate tracking system 28 that observes the debris along its path to obtain accurate orbital parameters.

The operation count for the above algorithm can be computed. If one assumes that each hierarchical step computes $N_{skew} \times N_{skew}$ skew angles, for each of $N_{height} \times N_{time}$ pixels, and there are $N_{hierarchy}$ steps, then the total operation count is $N_{skew}^{2N_{hierarchy}} \times N_{height} \times N_{time}$ skew and downsample operations in the last hierarchical step, $N_{skew}^{2N_{hierarchy}-2} \times N_{height} \times N_{time}$ in the next-to-last hierarchical step, and so on. The total operation count is therefore:

$$\left( N_{skew}^{2N_{hierarchy}} + N_{skew}^{2N_{hierarchy}-2} + \ldots \right) \times N_{height} \times N_{time} = \frac{N_{skew}^{2N_{hierarchy}+2} - 1}{N_{skew}^2 - 1} \times$$

$$N_{height} \times N_{time}$$

$$\approx N_{skew}^{2N_{hierarchy}} \times$$

$$N_{height} \times N_{time}$$

On the other hand, the number of skew angles computed is every combination of choices in the hierarchy steps, so there are $N_{skewtot} = N_{skew}^{N_{hierarchy}}$ total skew angles in each dimension, and therefore $N_{skewtot}^2 \times N_{height} \times N_{time}$ total tracks. One is therefore computing $N_{skewtot}^2 \times N_{height} \times N_{time}$ tracks with slightly more than $N_{skewtot}^2 \times N_{height} \times N_{time}$ skew and downsample operations, which is close to optimal since it is near the minimum one operation per output.

We generically term this operation count as $O(N^4)$, since there are 4 dimensions which we are computing tracks over (2 angles, height, and time), and the computation count covers these 4 dimensions. As a comparison, shift-and-add processing computes all tracks from scratch, requiring $N_{height} \times N_{width} \times N_{time}$ computations for each of the $N_{skewtot}^2$ skew directions, and so computation count is $N_{skewtot}^2 \times N_{height} \times N_{width} \times N_{time}$ which is over 5 dimensions, so is termed $O(N^5)$.

In terms of the search module 24, the output from the hierarchical tracking algorithm is a set of parameters for each processing block:
the brightest integrated track's integrated intensity value,
the frame number associated with this track,
the height position associated with this track,
the width position associated with this track, and
the height and time skew values associated with this track.

The integrated track value is first compared with the background noise level for random tracks. This noise level will depend on background light level, so this background track noise will slowly change. A threshold is chosen so that the random noise events are unlikely, by selecting a desired false alarm rate. This threshold parameter is variable, as higher sensitivity is achieved for systems with higher false alarms.

In the conversion module 26, the skew angles are first converted to an angular direction and velocity across the detector array of the debris. Combining this with the frame number and height position results in a complete track definition associated with the debris image traversing the detector pixels.

Using knowledge of the telescope orientation and effective focal length, this movement across the detector array is digitally converted to an angular motion across the sky. This motion across the sky is converted to an estimated orbital trajectory using basic knowledge of orbital dynamics.

The orbital dynamics computation provides the estimated range. Roughly, debris with large angular velocity will be closer and debris with small angular velocity will be farther. Once we have an estimate for range, we can convert the integrated track value into an estimated absolute brightness of the debris, useful in estimating the size of the debris. Once these conversions have been made, the outputs are:
Debris tracks which exceed the chosen threshold,
Estimated absolute debris brightness of these tracks, and
Estimated orbital trajectory for these tracks.

The output of the cameras is on the order of 200 MB/s and there will be 20 or more cameras, so multiple GB/s of raw data is implicated.

Figure 4:
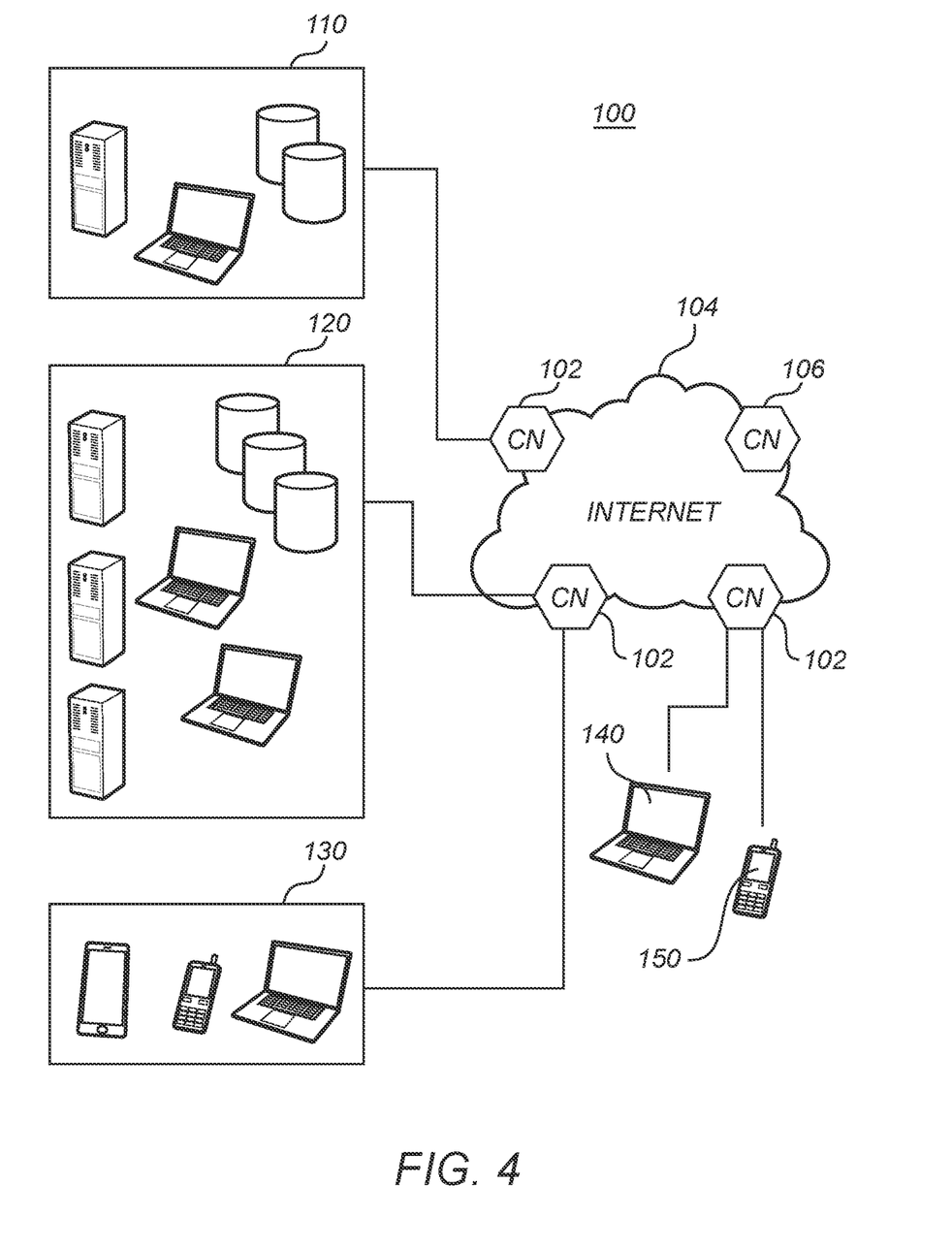
FIG. 4 is a network diagram of a cloud-based system for implementing the various algorithms and services of the present disclosure.
Figure 5:
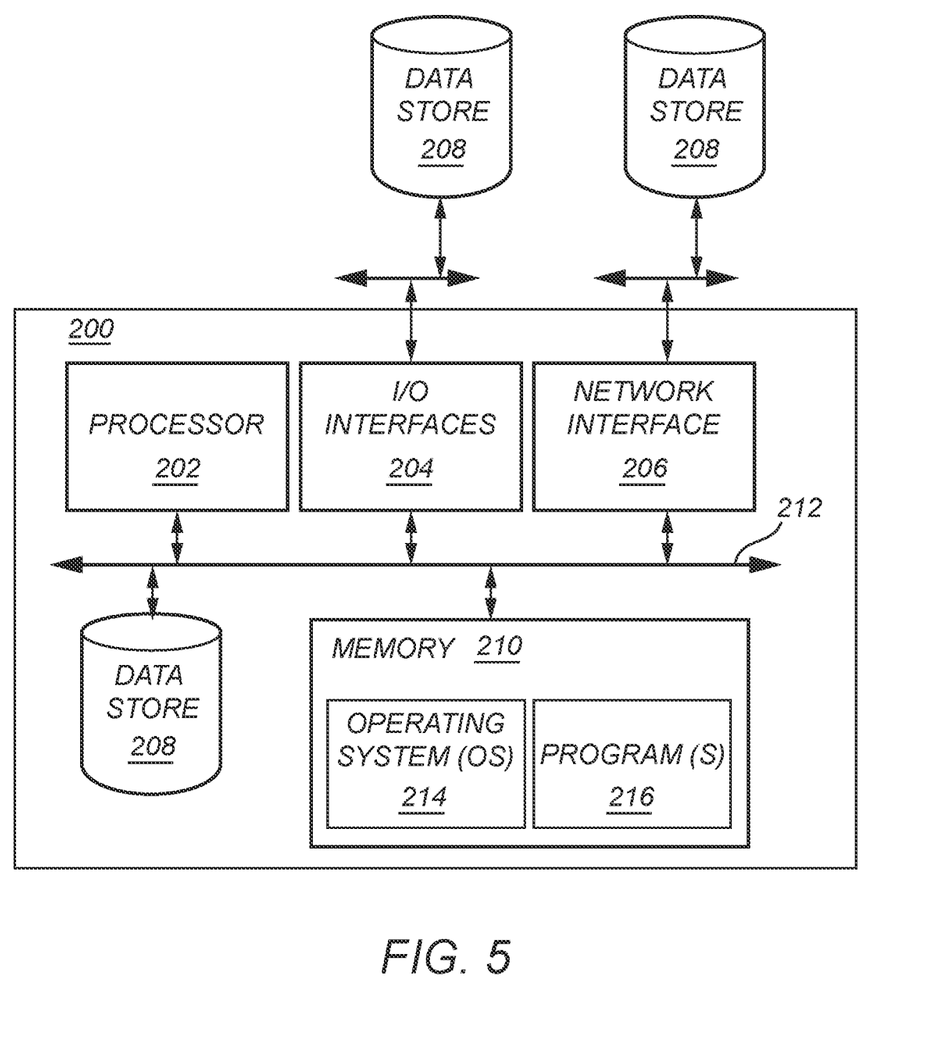
FIG. 5 is a block diagram of a server that may be used in the cloud-based system of FIG. 4 or stand-alone.

FIG. 4 is a network diagram of a cloud-based system 100 for implementing various cloud-based functions and services of the present disclosure. The cloud-based system 100 includes one or more cloud nodes (CNs) 102 communicatively coupled to the Internet 104 or the like. The cloud nodes 102 may be implemented as a server 200 (as illustrated in FIG. 5) or the like and can be geographically diverse from one another, such as located at various data centers around the country or globe. Further, the cloud-based system 100 can include one or more central authority (CA) nodes 106, which similarly can be implemented as the server 200 and be connected to the CNs 102. For illustration purposes, the cloud-based system 100 can connect to a regional office 110, headquarters 120, various employee's homes 130, laptops/desktops 140, and mobile devices 150, each of which can be communicatively coupled to one of the CNs 102. These locations 110, 120, and 130, and devices 140 and 150 are shown for illustrative purposes, and those skilled in the art will recognize there are various access scenarios to the cloud-based system 100, all of which are contemplated herein. The devices 140 and 150 can be so-called road warriors, i.e., users off-site, on-the-road, etc. The cloud-based system 100 can be a private cloud, a public cloud, a combination of a private cloud and a public cloud (hybrid cloud), or the like.

Again, the cloud-based system 100 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 110, 120, and 130 and devices 140 and 150. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein are not necessarily limited thereby.

FIG. 5 is a block diagram of a server 200, which may be used in the cloud-based system 100 (FIG. 4), in other systems, or stand-alone. For example, the CNs 102 (FIG. 4) and the central authority nodes 106 (FIG. 4) may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but is not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104 (FIG. 4). The network interface 206 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., a SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable medium having computer-readable code stored thereon for programming a computer, server, appliance, device, processor, circuit, etc. each of which may include a processor to perform functions as described and claimed herein. Examples of such computer-readable mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 6:
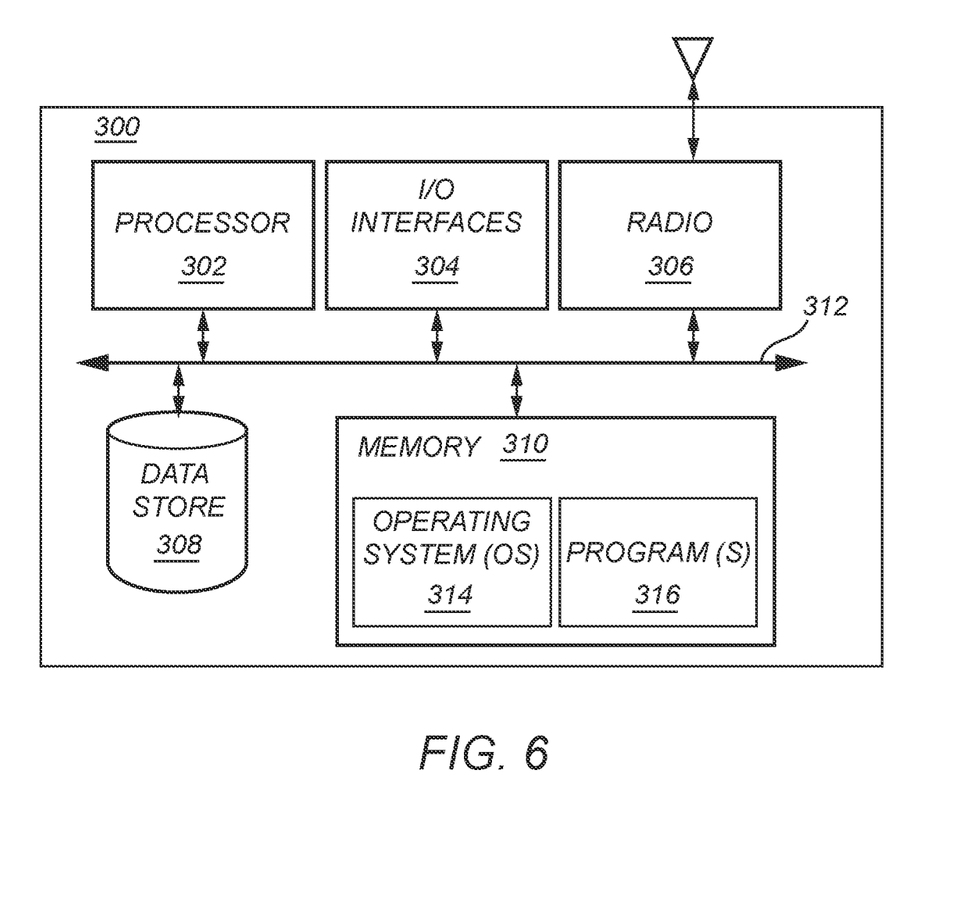
FIG. 6 is a block diagram of a user device that may be used in the cloud-based system of FIG. 4 or stand-alone.

FIG. 6 is a block diagram of a user device 300, which may be used in the cloud-based system 100 (FIG. 4), as part of a network, or stand-alone. Again, the user device 300 can be a vehicle, a smartphone, a tablet, a smartwatch, an Internet of Things (IoT) device, a laptop, a virtual reality (VR) headset, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but is not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

Again, the memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 6, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network, such as the cloud-based system 100 (FIG. 4).

Detecting small debris in earth orbit is challenging, given that debris smaller than 0.5 cm can still damage satellites. Optical systems using a telescope and a low noise camera can accomplish this task. The system of the present disclosure is targeted for detecting orbital debris.

Various groups have looked into the optical approach, some for detecting low earth orbit (LEO) debris, some for detecting geostationary orbit debris (GEO), and others for detecting near-earth asteroids. Detecting LEO objects is difficult because one must rely on illumination of the object by the sun shortly after sunset, but before the object moves into the shadow of the earth. In addition, immediately after sunset the sky is still bright, and one must wait until ~50 minutes after sunset before the sky background is sufficiently low that it is no longer a problem for short exposures. LEO orbit extends from an altitude of 160 km above the earth to an altitude of 2000 km. An object at 400 km will move into the earth's shadow at 79 minutes after sunset leaving a maximum observation time of ~30 minutes. This observation time grows to 162 minutes for an object at 2000 km.

Astronomical night begins when the sun is 18 degrees below the horizon, or at 72 minutes after sunset. Prior to this time, the sky will be too bright for long exposure times that are on the order of seconds. Many detection approaches rely on long exposures so that the moving object forms a streak, or trail, on the image. But the light from the sky will also integrate to form a uniform non-zero background. The DC component can be subtracted, but the shot noise of the background will obscure many small orbital debris objects whose optical signals are weak. Thus, LEO detection of small objects needs a short integration time, high frame-rate camera.

Thus, the present disclosure uses a high frame-rate camera so that LEO debris only moves a few pixels per frame, and so that the integrated sky background is very low. The camera is optionally one of the very low noise CMOS cameras that has ~0.5 electrons of readout noise, which allows us to see very faint (small) orbital debris. The algorithm goal is to detect debris in real-time so that it can be passed off to a tracker for refinement of the orbit while it is still visible. The algorithm must be fast to enable it to operate in real-time since we desire handoff to a tracker. The approach is hierarchical: we compute short tracks of possible debris across a few frames, and then compute longer track by building up from these shorter tracks (this is faster than searching over all possible lengths and directions of tracks). To accelerate the processing, we use one or more GPUs.

There are four major categories for prior approaches, which the present approach improves on:

Radon transform: this is an operation that is very good at detecting linear streaks in 2D images, Shift-and-Add: this is a technique where successive images are shifted and added based on an object velocity and angle in the 2D plane of the camera. Any object moving at the same velocity and angle will sum across all of the shifted images to form a strong peak, Synthetic tracking: another variant of shift-and-add, and Matched filter: the debris are modeled as a short streak and blurred with the psf of the telescope and atmospheric turbulence. This filter is convolved across each image to find any matching objects.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A method for searching for and finding orbital debris, the method comprising:
    using a ground-based telescope and a detector, capturing a plurality of image frames of potential orbital debris that is sunlit crossing a field of view of the telescope and detector;
    using a processing module operating on the plurality of image frames, computing multiple relatively shorter tracks for the potential orbital debris each across a relatively smaller number of image frames, and computing relatively longer tracks from the relatively shorter tracks; and
    selecting relatively longer tracks computed from the relatively shorter tracks that exceed a threshold as candidate tracks for the potential orbital debris.

2. The method of claim 1, further comprising, using a discrimination module operating on the plurality of image frames, further confirming the potential orbital debris with the relatively longer track based on the potential orbital debris exceeding one or more of a noise artifact threshold, a brightness threshold, and an orbital trajectory threshold.

3. The method of claim 1, further comprising, using refinement and discrimination modules operating on the plurality of image frames, further confirming the potential orbital debris by recomputing with a finer spatial and angular sampling around a candidate track location and angle, and selecting a more refined candidate track based on the potential orbital debris exceeding one or more of a noise artifact threshold, a brightness threshold, and an orbital trajectory threshold.

4. The method of claim 1, further comprising, using refinement and discrimination modules operating on the plurality of image frames, further confirming the potential orbital debris by recomputing with a relatively longer track than the candidate track along a candidate track location and angle based on the potential orbital debris exceeding one or more of a noise artifact threshold, a brightness threshold, and an orbital trajectory threshold.

5. The method of claim 1, wherein track parameters are converted to brightness and motion across the sky and rejected if the values are incompatible with a debris trajectory.

6. The method of claim 1, further comprising tracking subsequent movement of the potential orbital debris in a plurality of subsequent images frames obtained using the ground-based telescope and the detector or another imaging system.

7. The method of claim 1, wherein the processing module comprises a graphics processor.

8. The method of claim 1, wherein the detector collects image data at greater than 30 Hz.

9. The method of claim 1, wherein a tracking module receives the relatively longer track of the confirmed potential orbital debris from a conversion module within 30 seconds of data collection such that the potential orbital debris can be tracked in the plurality of subsequent images frames obtained using the ground-based telescope and the detector while the potential orbital debris is still overhead and visible to the ground-based telescope and the detector.

10. A system for searching for and finding orbital debris, the system comprising:
a ground-based telescope and a detector for capturing a plurality of image frames of potential orbital debris that is sunlit crossing a field of view of the telescope and detector;
a processing module operating on the plurality of image frames that:
computes multiple relatively shorter tracks for the potential orbital debris each across a relatively smaller number of image frames, and computes relatively longer tracks from the relatively shorter tracks; and
selects the relatively longer tracks computed from the relatively shorter tracks that exceed a threshold as candidate tracks for the potential orbital debris.

11. The system of claim 10, further comprising a discrimination module operating on the plurality of image frames for further confirming the potential orbital debris with the relatively longer track based on the potential orbital debris exceeding one or more of a noise artifact threshold, a brightness threshold, and an orbital trajectory threshold.

12. The system of claim 10, further comprising refinement and discrimination modules operating on the plurality of image frames for further confirming the potential orbital debris by recomputing with a finer spatial and angular sampling around a candidate track location and angle, and selecting a more refined candidate track based on the potential orbital debris exceeding one or more of a noise artifact threshold, a brightness threshold, and an orbital trajectory threshold.

13. The system of claim 10, further comprising refinement and discrimination modules operating on the plurality of image frames for further confirming the potential orbital debris by recomputing with a relatively longer track than the candidate track along a candidate track location and angle based on the potential orbital debris exceeding one or more of a noise artifact threshold, a brightness threshold, and an orbital trajectory threshold.

14. The system of claim 10, wherein the processing module comprises a graphics processor.

15. The system of claim 10, wherein the detector collects image data at greater than 30 Hz.

16. The system of claim 10, wherein a tracking module receives the relatively longer track of the confirmed potential orbital debris from a conversion module within 30 seconds of data collection such that the potential orbital debris can be tracked in the plurality of subsequent images frames obtained using the ground-based telescope and the detector while the potential orbital debris is still overhead and visible to the ground-based telescope and the detector.

17. A non-transitory computer readable medium comprising instructions stored in a memory and executed by a processor to carry out steps for searching for and finding orbital debris comprising:
using a ground-based telescope and a detector, capturing a plurality of image frames of potential orbital debris that is sunlit crossing a field of view of the telescope and detector;
using a processing module operating on the plurality of image frames, computing multiple relatively shorter tracks for the potential orbital debris each across a relatively smaller number of image frames, and computing relatively longer tracks from the relatively shorter tracks; and
selecting relatively longer tracks computed from the relatively shorter tracks that exceed a threshold as candidate tracks for the potential orbital debris.

18. The non-transitory computer readable medium of claim 17, the steps further comprising, using a discrimination module operating on the plurality of image frames, further confirming the potential orbital debris with the relatively longer track based on the potential orbital debris exceeding one or more of a noise artifact threshold, a brightness threshold, and an orbital trajectory threshold.

19. The non-transitory computer readable medium of claim 17, the steps further comprising, using refinement and discrimination modules operating on the plurality of image frames, further confirming the potential orbital debris by recomputing with a finer spatial and angular sampling around a candidate track location and angle, and selecting a more refined candidate track based on the potential orbital debris exceeding one or more of a noise artifact threshold, a brightness threshold, and an orbital trajectory threshold.

20. The non-transitory computer readable medium of claim 17, the steps further comprising, using refinement and discrimination modules operating on the plurality of image frames, further confirming the potential orbital debris by recomputing with a relatively longer track than the candidate track along a candidate track location and angle based on the potential orbital debris exceeding one or more of a noise artifact threshold, a brightness threshold, and an orbital trajectory threshold.

21. The non-transitory computer readable medium of claim 17, wherein track parameters are converted to brightness and motion across the sky and rejected if the values are incompatible with a debris trajectory.

22. The non-transitory computer readable medium of claim 17, the steps further comprising tracking subsequent movement of the potential orbital debris in a plurality of subsequent images frames obtained using the ground-based telescope and the detector or another imaging system.

23. The non-transitory computer readable medium of claim 17, wherein the processing module comprises a graphics processor.

24. The non-transitory computer readable medium of claim 17, wherein the detector collects image data at greater than 30 Hz.

25. The non-transitory computer readable medium of claim 17, wherein a tracking module receives the relatively longer track of the confirmed potential orbital debris from a conversion module within 30 seconds of data collection such that the potential orbital debris can be tracked in the plurality of subsequent images frames obtained using the ground-based telescope and the detector while the potential orbital debris is still overhead and visible to the ground-based telescope and the detector.

* * * * *